Sept. 24, 1963
A. J. SKALKA
3,104,723
ROTARY DAMMER PLOW
Filed Oct. 6, 1960
3 Sheets-Sheet 2
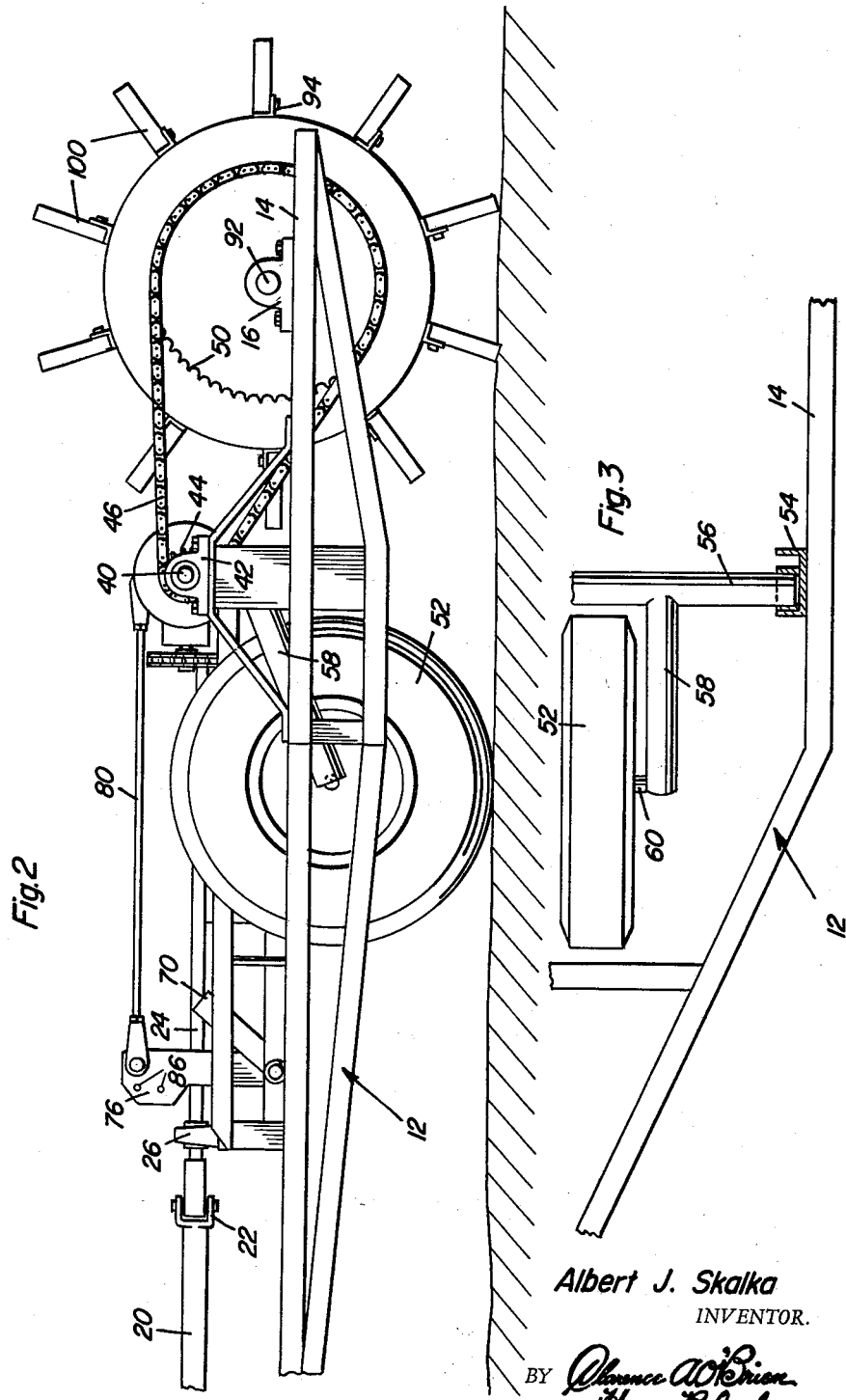
Albert J. Skalka
INVENTOR.

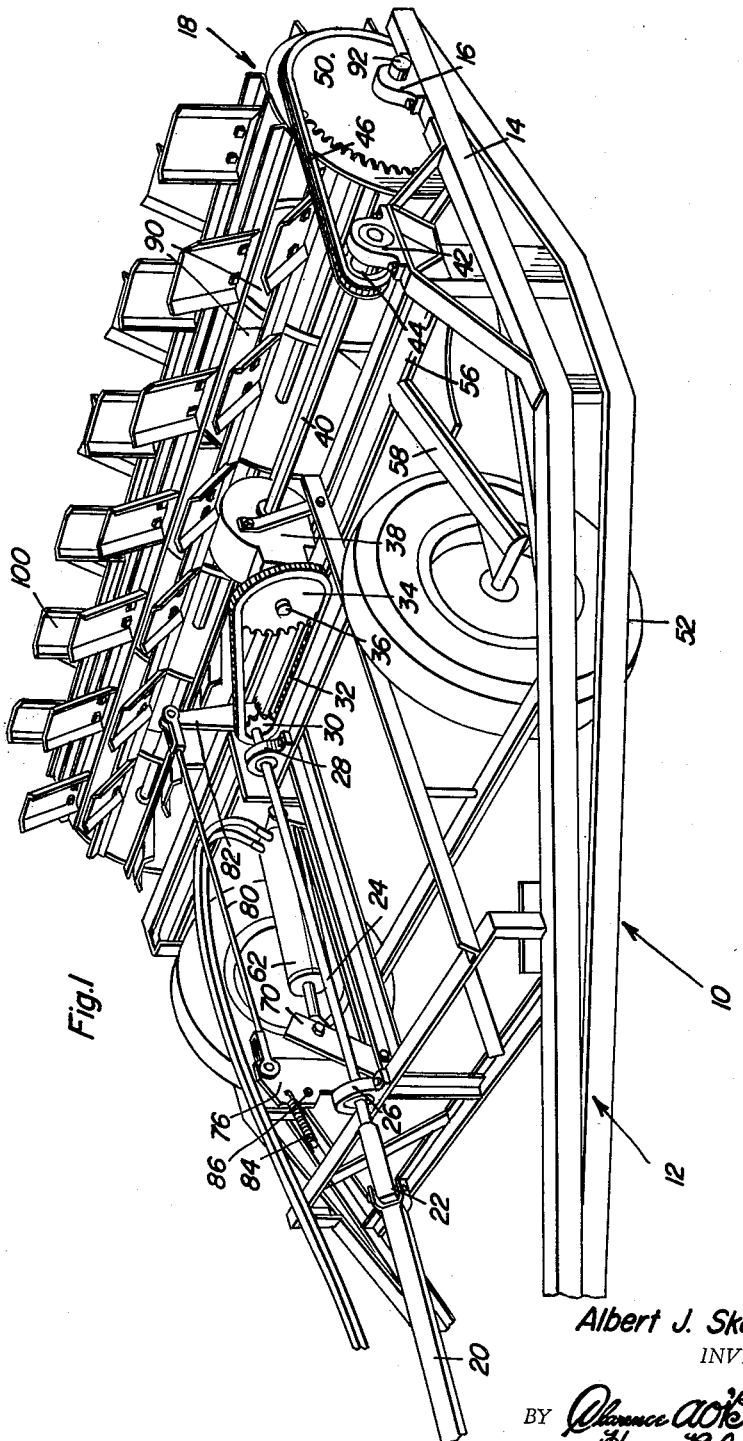

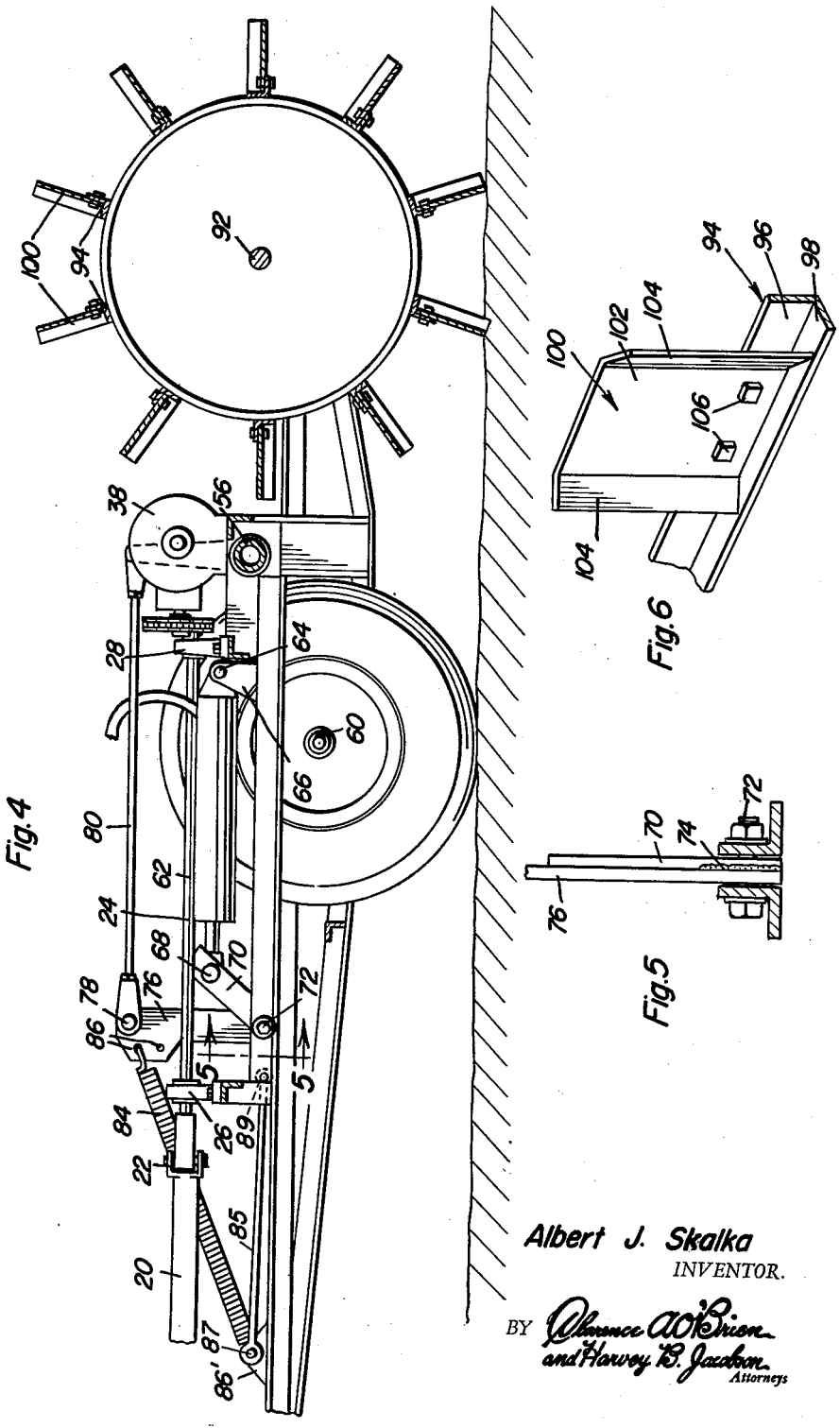

United States Patent Office 3,104,723
Patented Sept. 24, 1963

3,104,723
ROTARY DAMMER PLOW
Albert J. Skalka, Deweese, Nebr.
Filed Oct. 6, 1960, Ser. No. 60,890
4 Claims. (Cl. 172—413)

This invention comprises a novel and useful rotary dammer plow and more particularly pertains to an agricultural implement adapted to chop weeds, level, plow and work the soil and leave the same with numerous intermittently spaced small dams to prevent water run-off and soil erosion.

It is the primary object of this invention to provide a soil working implement capable of performing various agricultural operations upon the soil such as removing weeds, levelling the ground, packing and mulching the soil and leaving the surface of the ground with numerous small dams rising therefrom whereby to retard water run-off and minimize soil erosion.

A further object of the invention is to provide a device in accordance with the previous object which may be readily raised and lowered from and into operative contact with the soil to be treated by the device.

Yet another object of the invention is to provide a device in accordance with the foregoing objects and capable of being readily adjusted to vary the spacing of the forming of the dams by the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, parts of the front of the implement including the forward portion of the coil spring to be described being broken away and showing a preferred construction in accordance with this invention;

FIGURE 2 is a side elevational view of the arrangement of FIGURE 1 with parts omitted;

FIGURE 3 is a fragmentary detail view taken in plan with parts being broken away and shown in section and showing a portion of the means for raising and lowering the implement with respect to the surface of the soil being treated thereby;

FIGURE 4 is a view in vertical longitudinal section through a portion of the apparatus and showing in particular the mechanism for raising and lowering the same;

FIGURE 5 is a detail view taken upon an enlarged scale substantially upon the plane indicated by the section line 5—5 of FIGURE 4; and FIGURE 6 is a fragmentary detail perspective showing the mounting of one of the soil operating blades of the device.

The rotary dammer plow in accordance with this invention is indicated generally by the numeral 10 and as shown consists of a mobile frame 12 which is rearwardly divergent from its forward end by which it is coupled to a tractor or other means of towing, not shown, to generally parallel rear frame portions 14. The frame 12 includes the necessary longitudinally and transversely extending frame elements including brace members, and since the frame may be of numerous conventional designs, a detailed description of the same is believed to be unnecessary.

Rotatably mounted in bearings 16 mounted upon the rear frame portions 14, is a transversely extending unit or support in the form of a drum-like member indicated generally by the numeral 18 and which by means of these journal bearings is mounted for rotation about an axis which extends transversely of the elongated frame 12. Power operated means is provided for imparting rotation to the support or drum 18. For this purpose, there is provided a longitudinally extending driving shaft 20 the forward end of which is adapted to be connected in any suitable source of power, not shown, as for example the power plant of a tractor or the like. Adjacent its rear end, the driving shaft is connected by a universal joint 22 to intermediate shaft 24 journalled in suitable bearings as at 26 and 28 upon portions of the frame 12. At its rear end, the intermediate shaft 24 is provided with a sprocket wheel 30 which is connected as by a sprocket chain 32 with a driven sprocket wheel 34 secured to the power input shaft 36 of a gear reduction unit 38. The latter is likewise mounted upon the frame 12 and may be of any suitable type, including gear reduction units which are capable of being adjusted to give variable gear ratios between the power input and the power output shafts thereof.

The unit 38 is connected to and may comprise a lay shaft 40 which is in turn journalled as by a bearing 42 on a portion of the frame 12 and is provided with a sprocket gear as at 44 which by means of a sprocket chain 46 is coupled to a driven sprocket 50 which is secured to the support or drum 18 in any suitable manner. Thus, upon rotation being imparted to the driving shaft 20, the support or drum 18 in turn is rotated. Preferably the arrangement is such that the drum rotates about its axis in the same direction as the support wheels 52 of the frame 12 but at a lesser rate of speed for a purpose to be readily apparent.

Means is provided to effect a controlled raising or lowering of the support or drum 18 with respect to the surface of the ground. For this purpose, extending transversely between and journalled in suitable bearings such as those indicated at 54 in FIGURE 3 is a transversely disposed axle 56. The latter is provided with a pair of preferably integral lever arms 58 which at their extremities remote from the axle or shaft 56 have stub axles 60 thereon upon which are rotatably mounted the previously mentioned support wheels 52. It will now be apparent that by rocking the axle 56 in its bearings 54, that the frame 12 of the implement 10 may be vertically raised or lowered.

In order to effect such rocking movement there is provided a power operated means for this purpose.

This means preferably comprises a fluid pressure actuated cylinder and piston unit indicated by the numeral 62 and which at one extremity is pivoted as at 64 to a suitable bracket 66 carried by a portion of the frame 12. At its other end, the cylinder piston unit is pivoted as at 68 to a V-shaped lever comprising an arm 70 secured to a pivot 72, which may be in the form of a bolt or the like. As shown more clearly in FIGURE 5 in conjunction with FIGURE 4, the arm 70 is fixedly secured as by welding 74 to the pivoted end of an arm 76. The arm 76 at its upper end is connected by a pivot 78 and a connecting rod 80 to a crank arm or straight lever 82 fixedly secured to the axle 56. A coil spring 84 has one end anchored in the uppermost of a pair of vertically spaced apertures 86 in the arm 76 and its other end connected to a mounting bracket 86' carried by the forward portion of the frame 12. The coil spring therefore yieldingly urges the crank arm 82 in a direction to urge the support wheels 52 downwardly and thus support the frame at a given distance above the ground. However, this causes a yieldable connection and is readily overcome by actuation of the fluid pressure actuated unit 62 under the control of any suitable fluid pressure supplying and control system, not shown. As will be observed, connecting rod 80 is provided with adjustable clevises at opposite ends whereby to adjustably vary the positions of the members 76 and 82 with respect to each other.

The support means 18 as previously mentioned is of drum-like configuration. For this purpose there may be provided a plurality of disks 90 each secured to a shaft 92 by which the drum is rotatably mounted to the previously mentioned bearings 16. Secured to the periphery of the disks 90 is a plurality of transversely extending bars disposed in circumferentially spaced relation about the axis of rotation of the drum, these bars being indicated generally by the numeral 94. Each bar, as shown in FIGURE 6 consists of an angle member having the relatively perpendicular flanges 96 and 98 thereon.

A plurality of blades, each indicated generally by the numeral 100 is secured to the series of bars 94. Each blade preferably comprises a flat central portion in the form of a plate 102 having angulated side flanges constituting wings 104. Each blade is secured as by fastening bolts 106 to the flange 96 with the ends of the plate and wings abutting against the other flange 98. The plates project radially outwardly from the bars upon which they are mounted and the drum or support 18. Preferably the plates by virtue of their mounting upon the bars are disposed in rows with each row extending transversely of the frame and substantially parallel to the axis of rotation, and with the plates of one row being staggered with respect to those of the adjacent rows.

The arrangement is such that as shown in FIGURE 2 upon proper adjustment of the fluid pressure actuated cylinder unit 62, the frame may be lowered until the radially outer edges of the plates will engage the soil as shown in FIGURES 2 and 4. In this position, upon forward travel of the apparatus, the relatively slower travelling support or drum 18 will cause the plates to drag as they engage the ground. Consequently, each time a plate contacts the ground it will be dragged for a certain distance before its rotation causes it to leave the ground. In this dragging movement the plate will pile up in front of the same a dam or mound of earth. By virtue of the arrangement of the plates with respect to each other there will be produced upon the surface of the ground over which the device travels, a large number of small dams which thus break up the smooth configuration of the surface thereby reducing water run-off and lessening the danger of erosion to the soil.

It will be understood that the plates constitute implements or tools for working the soil and may be appropriately shaped or may be replaced by other plates to effect various desired operations, such as the killing of weeds, the raking or burying of leaves, the forming of mulch upon the soil, the packing or breaking of the soil as the plates penetrate the same to varying extents. In addition, when the device rolls over uneven terrain, the blades will serve to break and remove the higher portions thereof thus tending to level the soil behind the machine but leaving it provided with a large number of small dams thus preventing soil erosion.

It is evident that by employing various gear ratios in the speed reduction unit 38 or by shifting the gear ratio therein if the unit is of the variable or adjustable ratio type, the relative speed of rotation of the support 18 with respect to forward travel of the device can be readily varied thus controlling the spacing between successive portions of the soil which are worked by the device.

A rod 85 has one end pivotally connected as indicated at 87 to the bracket 86' for vertical swinging movement. The free end of the rod 85 is provided with an eye 89 for alignment with the lower aperture 86 when the arm 76 is in its forward position for receiving a suitable pin (not shown) for locking the frame 12 in elevated position, as when the implement is to be transported.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary dammer plow comprising, in combination, an elongated frame, a transverse shaft journaled on said frame, arms on said shaft, ground wheels rotatably mounted on said arms, a drum journaled on the frame in parallelism with the shaft, damming blades radiating from the drum, a straight lever fixed on the shaft, a generally V-shaped lever pivotally mounted on the frame, a rod operatively connecting the end portion of one of the arms of the V-shaped lever to the straight lever, resilient means on the frame operatively connected to said end portion of said V-shaped lever for yieldingly urging the wheels downwardly for floatingly supporting the frame with the drum thereon, and means on the frame connected to the end portion of the other arm of the V-shaped lever for urging the wheels downwardly and positively elevating the frame.

2. A rotary dammer plow in accordance with claim 1, the first-named means including a coil spring having one end anchored to the frame and its other end connected to said end portion of said one of the arms of said V-shaped lever.

3. A rotary dammer plow according to claim 1, the second-named means comprising a fluid pressure operated cylinder and piston power unit having one end pivotally connected to the frame and its end pivotally connected to said end portion of said other arm of said V-shaped lever.

4. The combination of claim 1, wherein the first-named means includes a coil spring connected to said end portion of said one of the arms of the V-shaped lever on the opposite side thereof from the rod, and wherein the second-named means comprises a fluid operated power unit pivotally mounted on the frame and operatively connected to said end portion of said other arm of said V-shaped lever.

References Cited in the file of this patent

UNITED STATES PATENTS

| | | |
|---|---|---|
| 1,330,057 | Burgess | Feb. 10, 1920 |
| 1,931,815 | Conley | Oct. 24, 1933 |
| 2,195,899 | Oetting | Apr. 2, 1940 |
| 2,205,752 | Silver | June 25, 1940 |
| 2,531,732 | Hoffman | Nov. 28, 1950 |
| 2,635,519 | Cook | Apr. 21, 1953 |

FOREIGN PATENTS

| | | |
|---|---|---|
| 1,039,167 | France | May 13, 1953 |